US012521899B2

(12) United States Patent
Van Diest et al.

(10) Patent No.: US 12,521,899 B2

(45) Date of Patent: Jan. 13, 2026

(54) HAIR-CUTTING UNIT FOR USE IN A HAIR-CUTTING APPLIANCE

(71) Applicant: KONINKLIJKE PHILIPS N.V., Eindhoven (NL)

(72) Inventors: Mike Van Diest, Groningen (NL); John Pragt, De Wilgen (NL); Martijn Dirk Klein Horsman, Kenmore, WA (US); Michael Reece Jenkins, Amsterdam (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 758 days.

(21) Appl. No.: 17/763,261

(22) PCT Filed: Sep. 30, 2020

(86) PCT No.: PCT/EP2020/077278

§ 371 (c)(1),
(2) Date: Mar. 24, 2022

(87) PCT Pub. No.: WO2021/069263

PCT Pub. Date: Apr. 15, 2021

(65) Prior Publication Data

US 2022/0339806 A1 Oct. 27, 2022

(30) Foreign Application Priority Data

Oct. 11, 2019 (EP) .................................... 19202866

(51) Int. Cl.

*B26B 19/14* (2006.01)
*B26B 19/38* (2006.01)

(52) U.S. Cl.

CPC .......... *B26B 19/145* (2013.01); *B26B 19/143* (2013.01); *B26B 19/388* (2013.01)

(58) Field of Classification Search

None

See application file for complete search history.

(56) References Cited

U.S. PATENT DOCUMENTS

| | | | |
|---|---|---|---|
| 3,233,323 | A | 2/1966 | Driessen |
| 5,687,481 | A | 11/1997 | De Boer |

(Continued)

FOREIGN PATENT DOCUMENTS

| | | | |
|---|---|---|---|
| EP | 0329244 | A1 | 8/1989 |
| EP | 0484795 | A1 | 5/1992 |

OTHER PUBLICATIONS

International Search Report and Written Opinion Dated Jan. 18, 2021 for International Application No. PCT/EP2020/077278 Filed Sep. 30, 2020.

*Primary Examiner* — Hwei-Siu C Payer

(57) ABSTRACT

A hair-cutting unit (4) for use in a hair-cutting appliance comprises an external cutting member (5) having hair-entry openings in a cutting track surface (58), an internal cutting member (6) having at least one hair-cutting element and being movable with respect to the external cutting member (5), and a skin-supporting structure (7) having a skin-supporting surface (71) for contacting a portion of skin to be subjected to a hair-cutting action. The external cutting member (5) is displaceable relative to the skin-supporting structure (7), and the hair-cutting unit (4) further comprises a safety mechanism which is designed to enable stepped and instantaneous variation between at least two discrete stages of a level ($l_c$) of the cutting track surface (58) with respect to a level ($l_s$) of the skin-supporting surface (71), in relation to pressure exerted by the external cutting member (5) on the skin.

15 Claims, 4 Drawing Sheets

(56) References Cited

U.S. PATENT DOCUMENTS

| | | | | |
|---|---|---|---|---|
| 2007/0124936 | A1 * | 6/2007 | Okabe | B26B 19/145 30/43.6 |
| 2007/0277379 | A1 * | 12/2007 | Okabe | B26B 19/145 30/346.51 |
| 2011/0197726 | A1 | 8/2011 | Kraus | |
| 2015/0224653 | A1 | 8/2015 | Narita | |
| 2017/0291319 | A1 | 10/2017 | Hendriks | |
| 2022/0339806 | A1 * | 10/2022 | Van Diest | B26B 19/388 |

* cited by examiner

Fig. 1
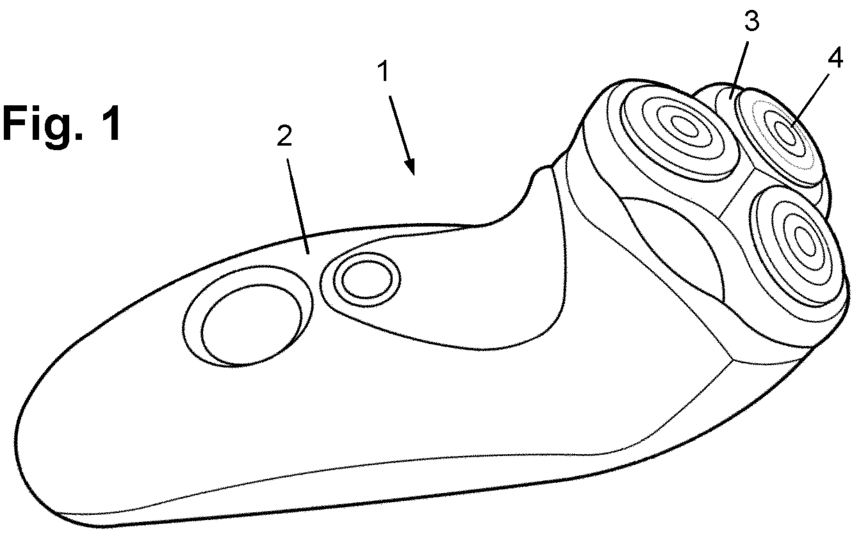
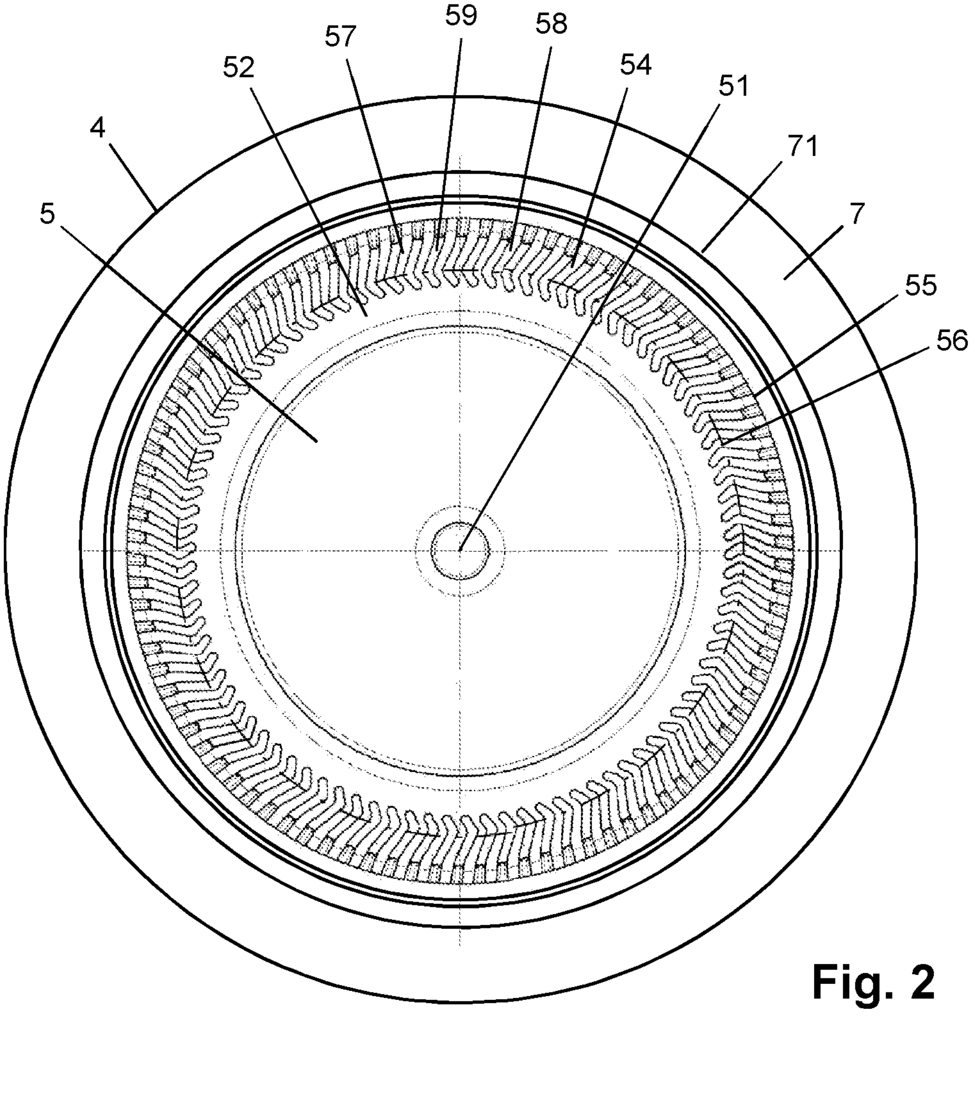
Fig. 2

Fig. 6
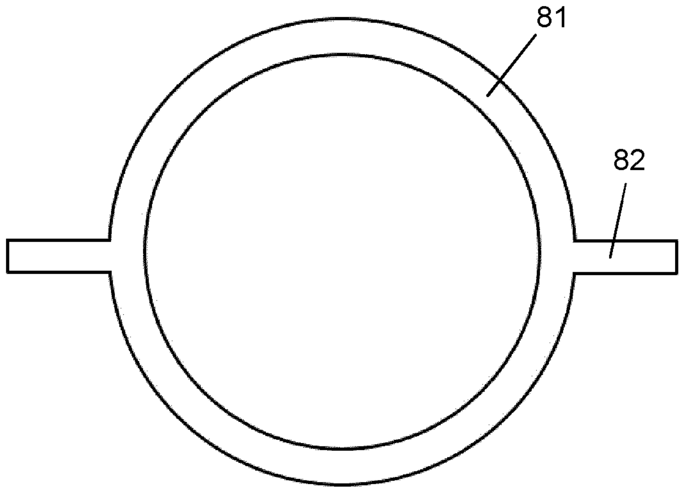
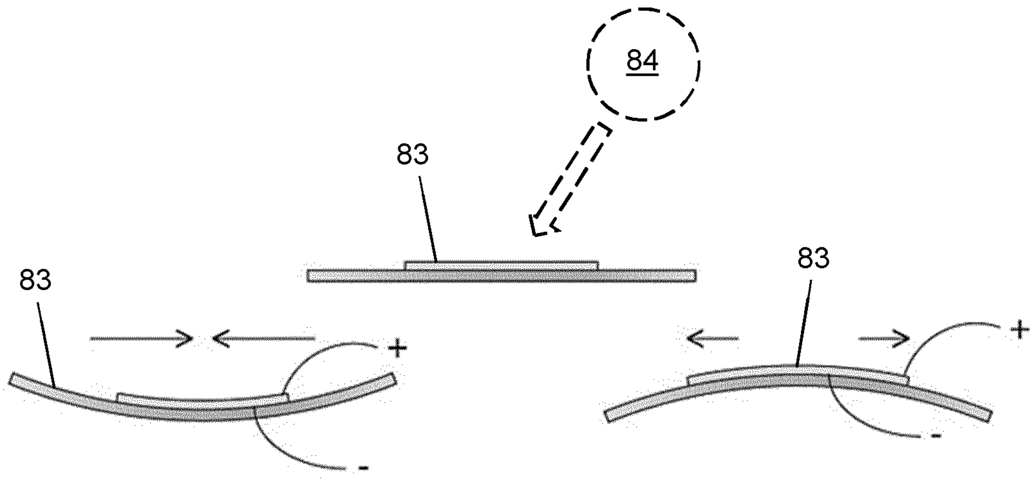
Fig. 7

HAIR-CUTTING UNIT FOR USE IN A HAIR-CUTTING APPLIANCE

CROSS REFERENCE TO RELATED APPLICATIONS

This application is the U.S. National Phase application under 35 U.S.C. § 371 of International Application No. PCT/EP2020/077278 filed Sep. 30, 2020, which claims the benefit of European Patent Application Number 19202866.0 filed Oct. 11, 2019. These applications are hereby incorporated by reference herein.

FIELD OF THE INVENTION

The invention relates to a hair-cutting unit for use in a hair-cutting appliance, comprising an external cutting member having hair-entry openings in a cutting track surface, an internal cutting member having at least one hair-cutting element and being movable with respect to the external cutting member, and a skin-supporting structure having a skin-supporting surface for contacting a portion of skin to be subjected to a hair-cutting action.

Further, the invention relates to a hair-cutting appliance such as a shaving appliance, comprising at least one hair-cutting unit as mentioned.

BACKGROUND OF THE INVENTION

The invention is in the field of hair-cutting appliances, particularly hair-cutting appliances which are designed to perform shaving actions and the like in which hairs are cut at a position close to the skin. In general, a hair-cutting appliance comprises a head where one or more hair-cutting units are located. A particularly common design uses three hair-cutting units in an equilateral triangular configuration. Each hair-cutting unit comprises an assembly of an internal cutting member and an external cutting member which is arranged to cover the internal cutting member, the external cutting member being provided with a series of hair-entry openings for allowing hairs to reach through the external cutting member and encounter the internal cutting member during a hair-cutting action. In a practical design, the external cutting member is generally cup-shaped and has a substantially circular periphery, wherein the hair-entry openings may be shaped like elongated slits extending substantially radially with respect to a central axis of the external cutting member, in one or more annular areas referred to as cutting tracks. Such an external cutting member is particularly suitable to be used in a hair-cutting appliance of the rotary type, i.e. a hair-cutting appliance including at least one hair-cutting unit in which the internal cutting member is arranged so as to rotate during operation.

The external cutting member has a cutting track surface for contacting the skin at the position of the cutting track(s) during a hair-cutting action. At positions where the hair-entry openings are delimited, cutting surfaces are present in the external cutting member. The internal cutting member includes blades having cutting edges. During a hair-cutting action, hairs entering the hair-entry openings are sheared between the cutting surfaces and the cutting edges, and are cut as a result thereof. Proper use of the hair-cutting appliance involves putting the appliance to an active state, i.e. a state in which the internal cutting member of the at least one hair-cutting unit is moved, and moving the head over a skin area which is to be subjected to a hair-cutting action.

Besides the internal cutting member and the external cutting member, a hair-cutting unit may comprise a skin-supporting structure having a skin-supporting surface for contacting a portion of skin to be subjected to a hair-cutting action. In order to achieve optimal hair-cutting results, it may be practical for the skin-supporting structure to be designed such that the skin-supporting surface is at a position of surrounding the external cutting member at a level below the level of the cutting track surface of the external cutting member. The skin-supporting structure of the hair-cutting unit has a function in assisting a user of a hair-cutting appliance in positioning the head of the hair-cutting appliance on the skin during movement of the head with respect to the skin. Further, when the head of the hair-cutting appliance is pressed against the skin during use, pressure is distributed over the cutting track surface of the external cutting member and the skin-supporting surface of the skin-supporting structure of the at least one hair-cutting unit of the hair-cutting appliance. The skin-supporting surface may be designed in such a way that a contacted portion of skin is stretched to some extent in order to enable a hair-cutting action with no or only minimal irritation of the skin.

In the field of electric rotary shavers, the need to avoid skin irritation during a shaving action is an important issue. Research has shown that skin irritation can result from a number of phenomena which may occur during a shaving action, including hair manipulation, skin manipulation and skin cutting. Skin cutting takes place in a cutting unit when the external cutting member is pressed with excessive force, i.e. a force which is higher than a force associated with intended normal use, on the skin and the skin domes through the hair-entry openings and gets cut by the internal cutting member as a result thereof.

SUMMARY OF THE INVENTION

It is an object of the invention to provide a hair-cutting unit which is suitable for use in a hair-cutting appliance and which comprises components for realizing the actual hair-cutting functionality of the hair-cutting appliance. In particular, it is an object of the invention to provide an improvement to the design of a hair-cutting unit so that skin irritation resulting from skin cutting may be significantly reduced or even eliminated without necessarily reducing hair-cutting performance in terms of closeness.

In view of the foregoing, the invention provides a hair-cutting unit for use in a hair-cutting appliance, comprising an external cutting member having hair-entry openings in a cutting track surface, an internal cutting member having at least one hair-cutting element and being movable with respect to the external cutting member, and a skin-supporting structure having a skin-supporting surface for contacting a portion of skin to be subjected to a hair-cutting action, wherein the external cutting member is displaceable relative to the skin-supporting structure, and wherein the hair-cutting unit further comprises a safety mechanism which is designed to enable stepped variation between at least two discrete stages of a level of the cutting track surface with respect to a level of the skin-supporting surface, in relation to pressure exerted by the external cutting member on the skin, wherein the safety mechanism is configured to maintain a default stage as long as the pressure exerted by the external cutting member on the skin is below a predefined threshold value, the default stage involving a most protruding position of the external cutting member in which the cutting track surface protrudes with respect to the skin-supporting surface to a maximum extent, and to instantaneously set a retracted stage the moment the pressure exerted by the external cutting member on the skin increases and passes the predefined threshold value, the retracted stage involving a less protruding position of the external cutting member and a retracted position of the cutting track surface with respect to a position of the cutting track surface in the default stage.

It follows from the foregoing definition that the hair-cutting unit according to the invention is equipped with a safety mechanism which is designed to enable stepped variation between at least two discrete stages of a level of the cutting track surface with respect to a level of the skin-supporting surface, in relation to pressure exerted by the external cutting member on the skin. One of the at least two discrete stages is a default stage which is to be maintained as long as the pressure exerted by the external cutting member on the skin is below a predefined threshold value, and another of the at least two discrete stages is a retracted stage which is to be instantaneously set the moment the pressure exerted by the external cutting member on the skin increases and passes the predefined threshold value. By choosing the threshold value so as to be a value associated with a transition from normal use and associated normal, allowable pressure to incorrect use and associated excessive pressure causing skin to dome through the hair-entry openings of the external cutting member at a too high degree, it is achieved that during normal use, closeness of a hair-cutting action is optimal by allowing the external cutting member to be in a most protruding position, and that when the pressure exerted by the external cutting member on the skin gets too high, the safety mechanism reacts by instantaneously and step-wise realizing a retracted position of the external cutting member, for example by causing the external cutting member to instantaneously and step-wise move in an inward direction with respect to the skin-supporting structure. The retracted position of the external cutting member can be chosen such that hair-cutting performance is still acceptable. In general, in the retracted stage, it may be so that the cutting track surface has moved to a level which is closer to the level of the skin-supporting surface, that the cutting track surface has moved to a level which is substantially the same as the level of the skin-supporting surface, or, in case it is intended to temporarily interrupt a hair-cutting action as soon as and as long as excessive pressure occurs, that the cutting track surface has moved to a level which is retracted with respect to the level of the skin-supporting surface.

On the basis of the presence of the safety mechanism in the hair-cutting unit, it is achieved that as long as the pressure exerted by the external cutting member on the skin is in a normal range of values, exposure of the external cutting member in the sense of accessibility of the external cutting member for contact is at a constant optimal level for best performance, i.e. for optimal closeness. When the user presses so hard that the pressure exerted by the external cutting member on the skin increases to such an extent that the pressure passes a predefined threshold, the safety mechanism is activated to instantaneously and step-wise decrease the level of exposure of the external cutting member, as a result of which a potential situation of skin protruding inside the external cutting member is prevented from occurring, whereby skin cutting is prevented and skin irritation is minimized. Thus, the safety mechanism causes the external cutting member to "jump" between the default position involving maximal exposure and the retracted position involving less exposure in relation to the pressure acting between the external cutting member and the skin, which will hereinafter also be referred to as contact pressure. According to the invention, there is no need to compromise between skin comfort and hair-cutting performance as long as the contact pressure is at a normal, acceptable value. It depends on user behavior whether or not the safety mechanism will be activated during a hair-cutting action. In this respect, it is to be noted that the invention relates to a hair-cutting appliance comprising at least one hair-cutting unit which is equipped with the safety mechanism as defined in the foregoing, and that it may be practical for such a hair-cutting appliance to further comprise a feedback system which is configured to provide feedback to a user of the hair-cutting appliance when the pressure exerted by the external cutting member on the skin is above the predefined threshold value. The fact is that in such a case, the user is allowed to adapt his/her behavior in such a way as to avoid excessive contact pressure as much as possible, so that the best possible hair-cutting results can be obtained with only minimal skin irritation or even no skin irritation at all. Many practical embodiments of the feedback system are feasible, for example, a feedback system which is capable of providing feedback through at least one of an audio signal, a flashing light and vibration or the like may be applied in the hair-cutting appliance.

In practical cases, it may be sufficient if a distance between the level of the cutting track surface with respect to the level of the skin-supporting surface in the most protruding position of the external cutting member and in the less protruding position of the external cutting member, respectively, i.e. a length of a displacement path of the cutting track surface between two subsequent stages of the safety mechanism, is in a range of 300 to 1,000 μm. Preferably, a minimum of 200 μm is applicable to the distance as mentioned. The safety mechanism may be designed with two discrete stages only, namely the default stage and one retracted stage. On the other hand, it is possible for the safety mechanism to be designed with more discrete stages and to have two or more retracted stages besides the default stage. For example, in a case in which the safety mechanism is designed with three discrete stages, the safety mechanism may be activated to instantaneously realize a first retracted stage the moment the contact pressure increases from a normal, acceptable value and passes a first threshold value, and when the contact pressure increases even further, to instantaneously realize a second retracted stage of even further retraction of the external cutting member the moment the contact pressure increases further and passes a second threshold value. In such a case, the difference between the default stage and the first retracted stage may be the same as the difference between the retracted stages, but it is also possible that the one difference involves another distance than the other.

Many practical embodiments of the safety mechanism are feasible within the framework of the invention.

According to one example, the safety mechanism comprises a sensor system including at least one sensor which is configured to measure the pressure exerted by the external cutting member on the skin and/or at least one parameter related thereto, and an electrical actuator which is configured to displace the external cutting member relative to the skin-supporting structure in response to the sensor system. The sensor system may be of any appropriate design. For example, the sensor system may comprise a sensor which is configured to measure a force acting on the hair-cutting unit and at least one sensor which is configured to measure an area through which skin is contacted, so that pressure can be computed and compared to a predefined threshold value. The area through which skin is contacted can be measured in a variety of ways, capacitive sensing being one of the practical possibilities in this respect. On the other hand, when it is assumed that the contact area is of a more or less constant size, it may be sufficient to only measure a force at one or more representative positions in the hair-cutting unit.

The at least one sensor of the sensor system may have any suitable arrangement with respect to one or more other components of the hair-cutting unit, wherein it is noted that it may be practical for the at least one sensor to be arranged in one of the skin-supporting structure and the external cutting member. The actuator may be of any suitable type. For example, the actuator may be a piezo bending actuator having at least two stable bent conditions depending on a voltage applied to the actuator. In such a case, each of the discrete stages of the safety mechanism can be associated with one of the stable bent conditions of the actuator. As soon as it appears that the pressure passes a threshold value, the stage of the safety mechanism can instantaneously be changed by changing the voltage applied to the actuator, wherein it is possible to use the associated change of appearance of the actuator in a mechanical way for causing a displacement of the external cutting member, for example. In this respect, it is to be noted that the actuator may act directly on the external cutting member for displacing the external cutting member, or indirectly. A practical example of the latter option is a case in which the external cutting member is supported on a carrier of the skin-supporting structure and the actuator is arranged and configured to act on the carrier and the external cutting member for displacing the external cutting member relative to the skin-supporting structure.

In another embodiment, the safety mechanism is of a purely mechanical nature. In particular, it may be so that the safety mechanism comprises a mechanical member which is configured to be deformable between at least two stable positions under the influence of the pressure exerted by the external cutting member on the skin and configured to displace the external cutting member relative to the skin-supporting structure as a result of a deformation of the mechanical member, wherein optionally the mechanical member is biased towards one of the stable positions so as to assume one of the stable positions as a default position when the pressure exerted by the external cutting member on the skin is below the predefined threshold value.

The mechanical member as mentioned in the foregoing may be of any appropriate design. For example, the mechanical member may comprise a bi-stable spring, in which case the bi-stable spring may be a buckling spring which is deformable under the influence of pressure between a position in which the spring is buckled inwardly and a position in which the spring is buckled outwardly. In conformity with what has already been explained in respect of the embodiment of the safety mechanism comprising a sensor system and an electrical actuator, it is possible for the mechanical component to act directly on the external cutting member for displacing the external cutting member, or indirectly such as when the external cutting member is supported on a carrier of the skin-supporting structure and the mechanical component is arranged and configured to act on the carrier and the external cutting member for displacing the external cutting member relative to the skin-supporting structure.

The above-described and other aspects of the invention will be apparent from and elucidated with reference to the following detailed description of practical embodiments of a hair-cutting unit for use in a hair-cutting appliance.

BRIEF DESCRIPTION OF THE DRAWINGS

The invention will now be explained in greater detail with reference to the figures, in which equal or similar parts are indicated by the same reference signs, and in which:

FIG. 1 diagrammatically shows a perspective view of a hair-cutting appliance including a head in which three hair-cutting units are located;

FIGS. 2, 3 and 4 relate to a hair-cutting unit comprising an external cutting member, an internal cutting member, a skin-supporting structure and a safety mechanism, wherein FIG. 2 diagrammatically shows a top view of the hair-cutting unit, wherein FIG. 3 diagrammatically shows a sectional view of the hair-cutting unit with the external cutting member in a most protruding position, and wherein FIG. 4 diagrammatically shows a sectional view of the hair-cutting unit with the external cutting member in a less protruding position;

FIG. 6 diagrammatically shows a top view of the buckling spring;

FIG. 7 illustrates the functionality of a piezo bending actuator;

DETAILED DESCRIPTION OF THE EMBODIMENTS

FIG. 1 shows a shaving appliance of the rotary type as a practical example of a hair-cutting appliance 1. The hair-cutting appliance 1 comprises a body 2 which is intended to be taken hold of by a user of the hair-cutting appliance 1, and a head 3 which is intended to be pressed against a skin area to be subjected to a hair-cutting action. The body 2 of the hair-cutting appliance 1 is also commonly referred to as handle. For various reasons such as a need to service and/or clean the head 3, a need to replace the head 3 by a head of another type, etc., it is practical if the head 3 is removably or hingeably mounted to the body 2. The head 3 includes a number of hair-cutting units 4, the number being three in the shown example. When the hair-cutting appliance 1 is applied for the purpose of subjecting a skin area to a hair-cutting action, the actual process of cutting off hairs protruding from the skin area takes place at the position of the hair-cutting units 4.

Figure 3:
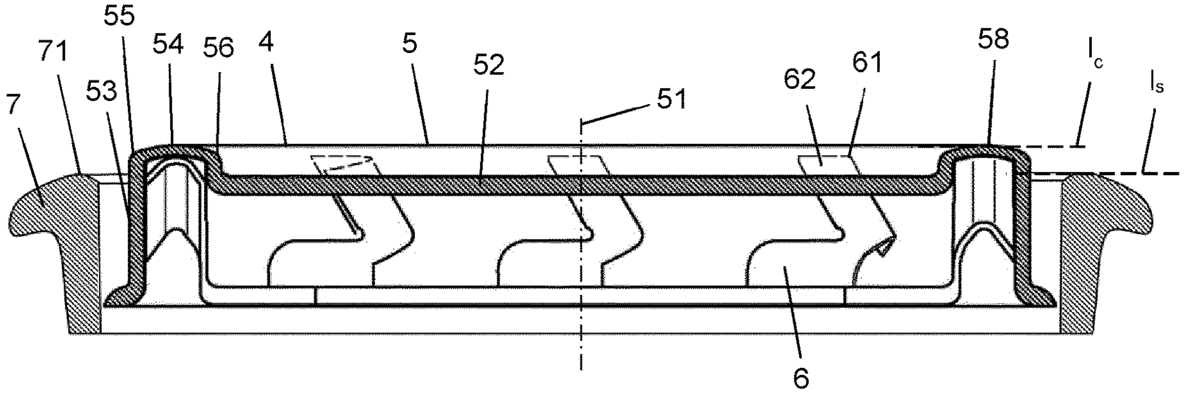
Figure 4:
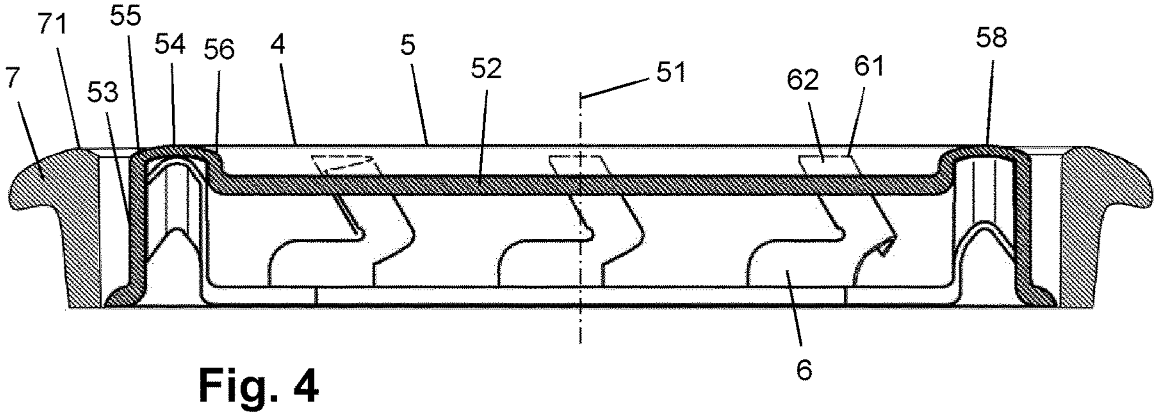

With reference to FIGS. 2, 3 and 4, a hair-cutting unit 4 will now be described in more detail. The hair-cutting unit 4 comprises an external cutting member 5 and an internal cutting member 6. The external cutting member 5 is of a generally cup-shaped design, having a substantially circular periphery and a central axis 51, whereby the external cutting member 5 is suitable for at least partially accommodating the internal cutting member 6 in its interior. In the cup-shaped design, the external cutting member 5 comprises a base 52 and an annular wall 53 extending from the base 52. In the base 52, an annular cutting track 54 is present, which is delimited by two concentrically arranged peripheral rims 55, 56, namely an outer peripheral rim 55 and an inner peripheral rim 56. The external cutting member 5 comprises lamellae 57 extending along the entire width of the cutting track 54 between the peripheral rims 55, 56, in a substantially radial direction relative to the central axis 51 of the external cutting member 5.

At the position of the cutting track 54, the external cutting member 5 has a cutting track surface 58 for contacting the skin of the user during a hair-cutting action. Apertures as present between the lamellae 57 constitute hair-entry openings 59 in the cutting track surface 58. Sides of the lamellae 57 constitute cutting surfaces suitable for cutting off hairs in cooperation with hair-cutting edges 61 of hair-cutting members 62 of the internal cutting member 6. A hair-cutting action can be performed when the internal cutting member 6 of the hair-cutting unit 4 is activated to rotate and a skin area is actually contacted by the external cutting member 5 at the position of the cutting track 54. When the hair-cutting unit 4 is moved over the skin area, it is achieved that hairs protruding from the skin area are caught in the hair-entry openings 59 of the external cutting member 5 and are cut off in that position as result of a cooperation between the cutting surfaces as present at the sides of the lamellae 57 delimiting the hair-entry openings 59 and the hair-cutting edges 61 of the rotating internal cutting member 6.

Besides the external cutting member 5 and the internal cutting member 6, the hair-cutting unit 4 comprises a skin-supporting structure 7 having a skin-supporting surface 71 for contacting a portion of skin to be subjected to a hair-cutting action. During a hair-cutting action, the hair-cutting unit 4 is pressed against the skin by the user, wherein the pressure is distributed over both the cutting track surface 58 and the skin-supporting surface 71. In the shown example, the skin-supporting unit 7 is generally ring-shaped and has a central space accommodating the assembly of the external cutting member 5 and the internal cutting member 6, wherein the skin-supporting surface 71 is an annular surface which is at a position of surrounding the external cutting member 5 more or less at the level of the basis 52 of the external cutting member 5. Hence, in the shown example, the cutting track surface 58 and the skin-supporting surface 71 are in a coaxial arrangement with respect to each other.

In the field of hair-cutting appliances such as shaving appliances, it is a known fact that it may occur that the user presses the head 3 on the skin with too much force, i.e. more force than necessary and intended in the design of the appliance. In situations involving excessive pressure, it may happen that the skin domes through the hair-entry openings 59 to such an extent that skin cutting occurs. Naturally, skin cutting is very unpleasant to the user and in order to avoid such an effect from taking place during a hair-cutting action, the hair-cutting unit 4 is equipped with a safety mechanism. In general, the safety mechanism is designed to enable stepped and instantaneous variation between at least two discrete stages of a level of the cutting track surface 58 with respect to a level of the skin-supporting surface 71, in relation to pressure exerted by the external cutting member 5 on the skin. In particular, the safety mechanism is configured to maintain a default stage as long as the pressure exerted by the external cutting member 5 on the skin is below a predefined threshold value, and to instantaneously set a retracted stage the moment the pressure exerted by the external cutting member on the skin increases and passes the predefined threshold value. The default stage is illustrated in FIG. 3 and involves a most protruding position of the external cutting member 5 in which the cutting track surface 58 protrudes with respect to the skin-supporting surface 71 to a maximum extent. The retracted stage is illustrated in FIG. 4 and involves a less protruding position of the external cutting member 5 and a retracted position of the cutting track surface 58 with respect to a position of the cutting track surface 58 in the default stage.

On the basis of the presence of the safety mechanism in the hair-cutting unit 4, it is achieved that the external cutting member 5 is normally in the most protruding position during a hair-cutting action. Should it happen to be so that the pressure exerted by the external cutting member 5 on the skin increases and eventually passes a predefined threshold value, the safety mechanism comes into action to cause instantaneous retraction of the external cutting member 5. In this way, the external cutting member 5 is moved away from the skin the very moment an actual risk of skin cutting arises, along such a distance that skin doming through the hair-entry openings 59 is drastically decreased or even totally avoided in order to prevent the skin cutting from happening. According to a preferred yet not essential option, the distance is chosen so as to not be so large that the hair-cutting process cannot take place any longer.

The distance along which the external cutting member 5 is suddenly retracted when the safety mechanism is activated, can be chosen such that the cutting track surface 58 ends up more or less at the same level as the skin-supporting surface 71. However, this is not essential, and it is also possible that the cutting track surface 58 is made to end up at a level that is still a protruding position with respect to the skin-supporting surface 71, for example. In this respect, it is noted that it may be practical if a distance along which the level of the cutting track surface 58 protrudes with respect to the level of the skin-supporting surface 71 is in a range of 0 to 1,000 μm, optionally even to 1,500 μm, wherein a higher value chosen from the range is applicable in a default situation, and wherein a lower value chosen from the range is applicable in a situation in which the safety mechanism is activated. For the sake of completeness, it is noted that the general reference to the level of the skin-supporting surface 71 is to be understood so as to be related to the most protruding portion of the skin-supporting surface 71. Likewise, the general reference to the level of the cutting track surface 58 is to be understood so as to be related to the most protruding portion of the cutting track surface 58. This is illustrated in FIG. 3, in which the level of the skin-supporting surface 71 is indicated by means of a dashed line $l_s$, and the level of the cutting track surface 58 is indicated by means of a dashed line $l_c$.

The functionality of the safety mechanism can be achieved in various ways. In other words, many practical embodiments of the safety mechanism are feasible, which in all cases are configured to cause instantaneous jumping of the hair-cutting unit 4 between predefined conditions as a function of contact pressure. In the following, a number of such practical embodiments are explained with reference to FIGS. 5 to 11.

Figure 5:
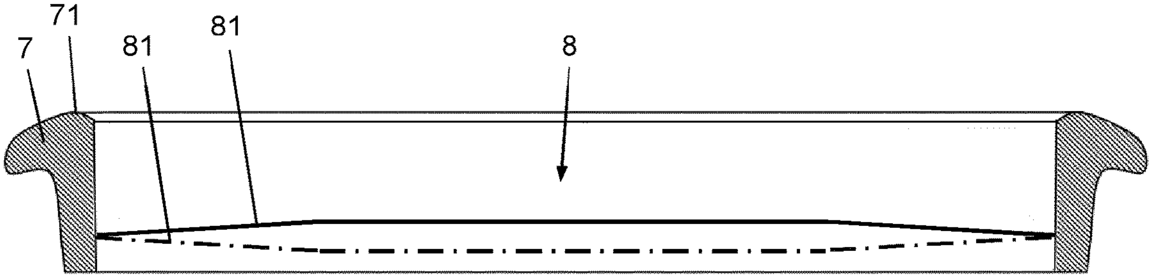
FIG. 5 illustrates a possible application of a buckling spring in a hair-cutting unit as part of the safety mechanism.

FIGS. 5 and 6 illustrate the possible application of a buckling spring 81 as part of a safety mechanism 8 in the hair-cutting unit 4, which is configured to buckle inwardly if a certain pressure threshold value is exceeded, starting from a default position in which the buckling spring 81 is buckled outwardly, and returning to the default position as soon as the contact pressure drops to below the threshold value. The position of the buckling spring 81 in which the buckling spring 81 is buckled inwardly is indicated in FIG. 5 by means of a dash-and-dot line, whereas the position of the buckling spring 81 in which the buckling spring 81 is buckled outwardly is indicated in FIG. 5 by means of a continuous line. For the sake of illustration, FIG. 5 only shows the skin-supporting structure 7 besides the indication of the two different stable positions of the buckling spring 81. By having a configuration in which the buckling spring 81 is coupled to the external cutting member 5, possibly to a carrier arranged to support the external cutting member 5, it is achieved that a change of the position of the buckling spring 81 results in displacement of the external cutting member 5. The buckling spring 81 as shown is of a design in which the buckling spring 81 includes two spokes 82, which does not alter the fact that alternative designs are feasible, including a design in which the buckling spring 81 includes three spokes 82 for improved torsional stability.

It is a well known fact that a change between the two stable positions of a buckling spring 81 under the influence of an increasing or a decreasing pressure takes place in an immediate/sudden fashion, so that a buckling spring 81 is very well suitable to realize the instantaneous movement of the external cutting member 5 as desired. Also, there is a notable difference between the respective positions of a buckling spring 81, so that when it is desired to provide feedback about the condition of the cutting unit 4 to a user, by means of a suitable type of warning signal or otherwise, this can very well be put to practice. Integrating a buckling spring 81 in a hair-cutting unit 4 does not require drastic adaptations of the design of the hair-cutting unit 4. Instead, it may be sufficient to only add a rim or the like for supporting the buckling spring 81 at an appropriate position.

As an alternative to relying on a system involving sudden mechanical reaction to varying pressure, it is possible to rely on a system involving two sub-functions, namely sensing and actuation. The sensing function may be performed to obtain information about pressure, force, size of skin contact surface, extent of skin doming, etc., wherein any suitable type of sensor system may be applied. Actuation may be performed as piezo actuation, on the basis of a torque key mechanism (spring and ball-click), as magnetic actuation, etc. For example, it is possible to have an embodiment of the hair-cutting unit 4 in which the hair-cutting unit 4 is equipped with a pressure sensor and a piezo actuator, wherein the piezo actuator is triggered to reduce exposure of the external cutting member 5 as soon as the pressure appears to get too high, i.e. appears to pass a predefined value.

FIG. 7 illustrates the principle of a piezo bending actuator 83 which is suitable for use in the safety mechanism 8 of a hair-cutting unit 4. A flat appearance of the piezo bending actuator 83 as shown at the top side of the figure may be the default position of the piezo bending actuator 83. A sensor system 84 is depicted as a dashed circle and an electrical signal which serves for controlling the piezo bending actuator 83 on the basis of sensing results is depicted as a dashed arrow in FIG. 7. Depending on the electrical signal provided to the piezo bending actuator 83, the piezo bending actuator 83 assumes one of a position in which the piezo bending actuator 83 is bent inwardly as shown at the left bottom side of FIG. 7 and a position in which the piezo bending actuator 83 is bent outwardly as shown at the right bottom side of FIG. 7. Thus, by having an effective coupling between the piezo bending actuator 83 and the external cutting member 5, and controlling the electrical signal in dependence of actual sensing results, an appropriate position of the external cutting member 5 can be set under all conditions.

Figure 8:
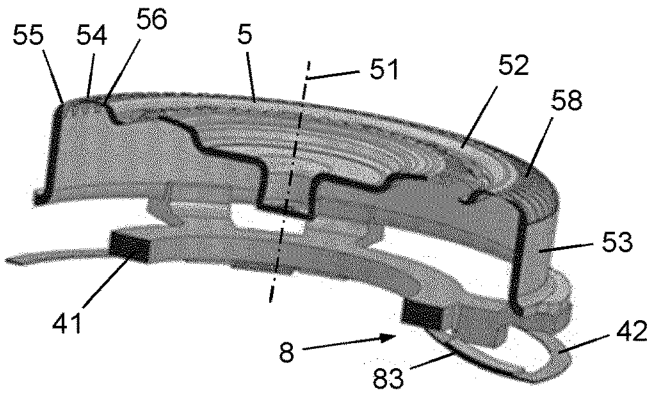
FIGS. 8, 9, 10 and 11 illustrate a possible application of the piezo bending actuator in a hair-cutting unit as part of the safety mechanism, wherein FIGS. 8 and 10 diagrammatically show a sectional view of an assembly including the external cutting member and the piezo bending actuator, with the external cutting member in a most protruding position and a retracted position, respectively, and wherein FIGS. 9 and 11 diagrammatically show a perspective top view of the hair-cutting unit, with the external cutting member in the most protruding position and the retracted position, respectively.
Figure 9:
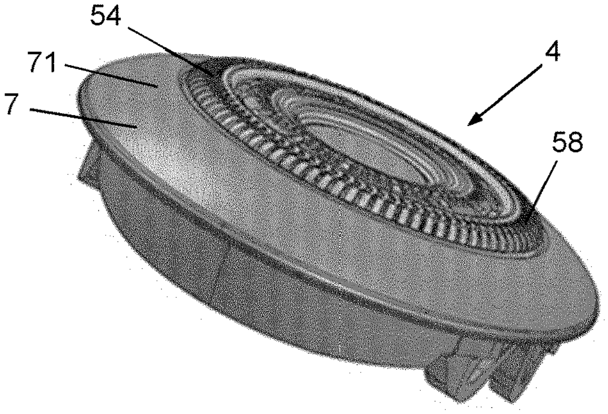
Figure 10:
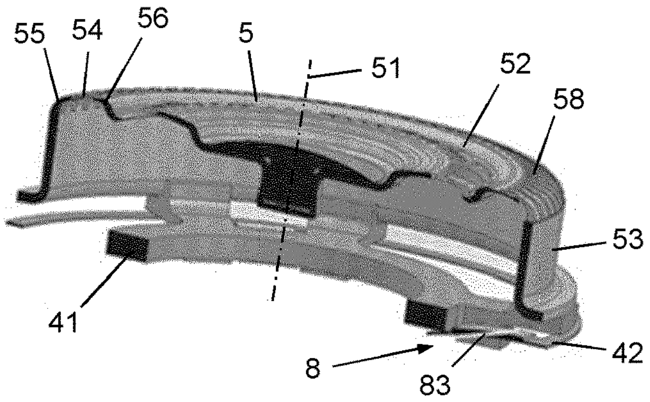
Figure 11:
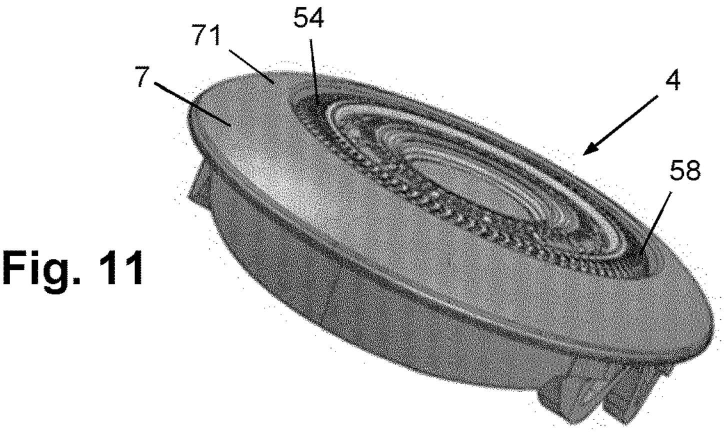

FIGS. 8 to 11 illustrate a practical way of applying a piezo bending actuator 83 in a hair-cutting unit 4. In FIGS. 8 and 10, it can be seen that the external cutting member 5 is supported on a carrier 41, and that the piezo bending actuator 83 is arranged so as to extend from a support 42, a free end part of the piezo bending actuator 83 contacting the carrier 41. As long as the sensing results indicate that the contact pressure is below a predefined threshold value, an electrical signal is emitted for having the piezo bending actuator 83 in the inwardly buckled position, as shown in FIG. 8, so that the most protruding position of the external cutting member 5 as shown in both FIGS. 8 and 9 can be realized. Starting from that situation, as soon as the sensing results indicate that the contact pressure passes the predefined threshold value, an electrical signal is emitted for putting the piezo bending actuator 83 to the outwardly buckled position, as shown in FIG. 10, so that a less protruding position of the external cutting member 5 as shown in both FIGS. 10 and 11 can instantaneously be realized.

Independent of the exact details of embodiments, by using a safety mechanism 8 as described in the foregoing in a hair-cutting unit 4, skin cutting is avoided by instantaneously retracting the cutting track surface 58 with respect to the skin-supporting surface 71, i.e. causing sudden displacement of the cutting track surface 58 to a position which is more towards or even behind the level 1, of the skin-supporting surface 71, when the contact pressure, i.e. the pressure exerted by the external cutting member 5 on the skin, passes a predefined threshold value. In this way, skin irritation is decreased while hair-cutting performance is not even compromised under conditions of normal, acceptable contact pressure.

It will be clear to a person skilled in the art that the scope of the invention is not limited to the examples discussed in the foregoing, but that several amendments and modifications thereof are possible without deviating from the scope of the invention as defined in the attached claims. It is intended that the invention be construed as including all such amendments and modifications insofar they come within the scope of the claims or the equivalents thereof. While the invention has been illustrated and described in detail in the figures and the description, such illustration and description are to be considered illustrative or exemplary only, and not restrictive. The invention is not limited to the disclosed embodiments. The drawings are schematic, wherein details which are not required for understanding the invention may have been omitted, and not necessarily to scale.

Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. Any reference signs in the claims should not be construed as limiting the scope of the invention.

Elements and aspects discussed for or in relation with a particular embodiment may be suitably combined with elements and aspects of other embodiments, unless explicitly stated otherwise. Thus, the mere fact that certain measures are recited in mutually different dependent claims does not indicate that a combination of these measures cannot be used to advantage.

The terms "comprise" and "include" as used in this text will be understood by a person skilled in the art as covering the term "consist of". Hence, the term "comprise" or "include" may in respect of an embodiment mean "consist of", but may in another embodiment mean "contain/have/be equipped with at least the defined species and optionally one or more other species".

In the context of the present text, an indication of a function as being of an instantaneous nature should be understood for its practical rather than its theoretical meaning. Hence, such an indication covers options in which a trigger is meant to be immediately followed by an action and in which there is a minimal delay between the trigger and the action caused by practical factors.

The invention claimed is:

1. A hair-cutting unit for use in a hair-cutting appliance, comprising:

an external cutting member having a cutting track surface that defines hair-entry openings;

an internal cutting member having at least one hair-cutting element and being movable with respect to the external cutting member;

a skin-supporting structure having a skin-supporting surface for contacting a portion of skin to be subjected to a hair-cutting action, wherein the external cutting member is displaceable relative to the skin-supporting structure; and a safety mechanism designed to enable stepped variation between at least two discrete stages of a level ($l_c$) of the cutting track surface with respect to a level ($l_s$) of the skin-supporting surface, in relation to pressure exerted by the external cutting member on the skin, wherein the safety mechanism is configured to maintain a default stage as long as the pressure exerted by the external cutting member on the skin is below a predefined threshold value, the default stage involving a most protruding position of the external cutting member in which the cutting track surface protrudes with respect to the skin-supporting surface to a maximum extent, and to instantaneously set a retracted stage when the pressure exerted by the external cutting member on the skin increases and passes the predefined threshold value, the retracted stage involving a less protruding position of the external cutting member and a retracted position of the cutting track surface with respect to a position of the cutting track surface in the default stage.

2. The hair-cutting unit according to claim 1, wherein a distance between a level ($l_c$) of the cutting track surface with respect to a level ($l_s$) of the skin-supporting surface in the most protruding position of the external cutting member and in the less protruding position of the external cutting member, respectively, is equal to or larger than 200 μm.

3. The hair-cutting unit according to claim 2, wherein the distance between the level ($l_c$) of the cutting track surface with respect to the level ($l_s$) of the skin-supporting surface in the most protruding position of the external cutting member and in the less protruding position of the external cutting member, respectively, is in a range of 300 to 1,000 μm.

4. The hair-cutting unit according to claim 1, wherein the safety mechanism comprises:

a sensor system including at least one sensor which is configured to measure the pressure exerted by the external cutting member on the skin and/or at least one parameter related thereto, and an electrical actuator configured to displace the external cutting member relative to the skin-supporting structure in response to the sensor system.

5. The hair-cutting unit according to claim 4, wherein the at least one sensor of the sensor system is arranged in the skin-supporting structure or the external cutting member.

6. The hair-cutting unit according to claim 4, wherein the electrical actuator is a piezo bending actuator having at least two stable bent conditions depending on a voltage applied to the piezo bending actuator.

7. The hair-cutting unit according to claim 4, wherein the external cutting member is supported on a carrier of the skin-supporting structure, and wherein the electrical actuator is arranged and configured to act on the carrier and the external cutting member for displacing the external cutting member relative to the skin-supporting structure.

8. The hair-cutting unit according to claim 1, wherein the safety mechanism is of a purely mechanical nature.

9. The hair-cutting unit according to claim 1, wherein the safety mechanism comprises a mechanical member configured to be deformable between at least two stable positions under the influence of the pressure exerted by the external cutting member on the skin and configured to displace the external cutting member relative to the skin-supporting structure as a result of a deformation of the mechanical member.

10. The hair-cutting unit according to claim 9, wherein the mechanical member is biased towards one of the at least two stable positions so as to assume the one of the at least two stable positions as a default position when the pressure exerted by the external cutting member on the skin is below the predefined threshold value.

11. The hair-cutting unit according to claim 9, wherein the mechanical member comprises a bi-stable spring.

12. The hair-cutting unit according to claim 11, wherein the bi-stable spring is a buckling spring which is deformable under the influence of pressure between a position in which the buckling spring is buckled inwardly and a position in which the buckling spring is buckled outwardly.

13. The hair-cutting unit according to claim 9, wherein the external cutting member is supported on a carrier of the skin-supporting structure, and wherein the mechanical member is arranged and configured to act on the carrier and the external cutting member for displacing the external cutting member relative to the skin-supporting structure.

14. A hair-cutting appliance, comprising at least one hair-cutting unit according to claim 1.

15. The hair-cutting appliance according to claim 14, further comprising a feedback system configured to provide feedback to a user of the hair-cutting appliance when the pressure exerted by the external cutting member on the skin is above the predefined threshold value.

* * * * *